(12) United States Patent
Lee et al.

(10) Patent No.: US 11,665,314 B2
(45) Date of Patent: May 30, 2023

(54) SIGNAL SPLITTING DEVICE

(71) Applicant: CABLE VISION ELECTRONICS CO., LTD., New Taipei (TW)

(72) Inventors: Chien-Chung Lee, New Taipei (TW); I-Sheng Ting, New Taipei (TW); Min-Chi Tseng, New Taipei (TW)

(73) Assignee: CABLE VISION ELECTRONICS CO., LTD., New Taipei (TW)

( * ) Notice: Subject to any disclaimer, the term of this patent is extended or adjusted under 35 U.S.C. 154(b) by 175 days.

(21) Appl. No.: 17/037,302

(22) Filed: Sep. 29, 2020

(65) Prior Publication Data
US 2021/0337165 A1 Oct. 28, 2021

(30) Foreign Application Priority Data
Apr. 27, 2020 (TW) ................................. 109204990

(51) Int. Cl.
*H04N 21/40* (2011.01)
*H04N 7/10* (2006.01)

(52) U.S. Cl.
CPC ............ *H04N 7/104* (2013.01); *H04N 7/108* (2013.01); *H04N 7/102* (2013.01); *H04N 7/106* (2013.01)

(58) Field of Classification Search
CPC .................................................. H04N 21/40
See application file for complete search history.

(56) References Cited

U.S. PATENT DOCUMENTS

| | | | | |
|---|---|---|---|---|
| 5,058,198 A * | 10/1991 | Rocci | ..................... | H03H 7/482 333/132 |
| 5,796,316 A * | 8/1998 | Romerein | .......... | H01R 13/6658 333/100 |
| 6,097,335 A * | 8/2000 | Cassen | ..................... | G01S 7/032 342/372 |
| 6,309,251 B1 * | 10/2001 | Tang | ........................ | H01R 9/05 439/263 |
| 10,153,600 B2 * | 12/2018 | Eriksen | ................ | H01R 24/545 |
| 10,971,838 B1 * | 4/2021 | Lee | ....................... | H01R 31/065 |
| 11,049,700 B2 * | 6/2021 | deVilliers | .......... | H01L 21/67069 |
| 2006/0148474 A1 * | 7/2006 | Reddy | ..................... | H03H 7/463 455/435.1 |
| 2012/0081190 A1 * | 4/2012 | Rijssemus | .............. | H04N 7/104 333/25 |

(Continued)

FOREIGN PATENT DOCUMENTS

TW 424992 U 3/2001

*Primary Examiner* — Mushfikh I Alam
(74) *Attorney, Agent, or Firm* — Hamre, Schumann, Mueller & Larson, P.C.

(57) ABSTRACT

A signal splitting device is to be installed in a CATV passive apparatus. The signal splitting device includes a circuit board that is disposed in a cover of the CATV passive apparatus, and a first connecting terminal and a second connecting terminal that are mounted to the circuit board and that are connected respectively to input and output terminals of the CATV passive apparatus. Each of the first and second connecting terminals includes a pin electrically connecting the circuit board and the corresponding one of the input and output terminals. The pin has a segment that is between the circuit board and the corresponding one of the input and output terminals and that has a length ranging from 4 to 15 mm.

17 Claims, 10 Drawing Sheets

(56) References Cited

U.S. PATENT DOCUMENTS

| | | | |
|---|---|---|---|
| 2013/0082711 A1* | 4/2013 | Albrecht | G01R 33/34 333/100 |
| 2013/0241671 A1* | 9/2013 | Huang | H01P 5/16 333/128 |
| 2014/0033264 A1* | 1/2014 | Li | H04N 21/61 725/127 |
| 2015/0380814 A1* | 12/2015 | Boutayeb | H01Q 15/14 29/601 |
| 2016/0365687 A1* | 12/2016 | Lu | H01R 24/547 |
| 2018/0335595 A1* | 11/2018 | Takeuchi | G02B 6/3897 |
| 2019/0067857 A1* | 2/2019 | Tatzel | G01R 1/06783 |
| 2021/0091519 A1* | 3/2021 | Henningsen | H01R 31/02 |
| 2021/0210875 A1* | 7/2021 | Eriksen | H01R 9/0518 |

\* cited by examiner

SIGNAL SPLITTING DEVICE

CROSS-REFERENCE TO RELATED APPLICATION

This application claims priority to Taiwanese Utility Model Patent Application No. 109204990, filed on Apr. 27, 2020.

FIELD

The disclosure relates to a signal splitting device.

BACKGROUND in a cable television (CATV) system, a CATV headend is used to gather television signals from various television stations, and then to aggregate the television signals into a main signal. The main signal is transmitted through a main transmission line, and then distributed to various receivers (such as CATV subscribers) through a CATV signal splitter connected to the main transmission line. Currently, a useful frequency range (band) of a conventional CATV signal splitter is limited to being between 5 MHz and 1.2 GHz due to frequency response of the conventional CATV signal splitter. The conventional CATV signal splitter includes abase, a cover connected to the base, a circuit board disposed in the cover, and a plurality of terminals disposed on the cover. The base is used to connect the main transmission line, and the circuit board in the cover is used to transmit signals and appropriately distribute the signals to the terminals. It is not possible to increase the bandwidth and bring the useful band of the CATV signal splitter to cover 1.5 GHz or above by simply replacing the circuit board in the cover. On the other hand, it is expensive to replace the whole CATV signal splitter with a new CATV signal splitter that supports greater bandwidth and covers higher frequency. In addition, during replacement, services provided to the CATV subscribers must be stopped, and the main transmission line needs to be cut and installed with a new connector so as to connect a base of the new CATV signal splitter. As a result, CATV service providers are unwilling to increase the bandwidth of the CATV system, so application of the CATV system is limited.

SUMMARY

Therefore, an object of the disclosure is to provide a signal splitting device that can alleviate at least one of the drawbacks of the prior art.

The signal splitting device is adapted to be installed in a cable television (CATV) passive apparatus. The CATV passive apparatus includes a base and a cover that are separably connected to each other, and an input terminal and an output terminal that are spaced apart from each other and that are mounted to the base.

According to the disclosure, the signal splitting device includes a circuit board, a first connecting terminal, a second connecting terminal and a signal splitting circuit.

The circuit board is adapted to be disposed in the cover.

The first connecting terminal is mounted to the circuit board, and is adapted to correspond to the input terminal in position and to be electrically connected to the input terminal.

The second connecting terminal is mounted to the circuit board, is spaced apart from the first connecting terminal, and is adapted to correspond to the output terminal in position and to be electrically connected to the output terminal.

The signal splitting circuit is disposed on the circuit board and is electrically connected between the first connecting terminal and the second connecting terminal.

Each of the first and second connecting terminals includes a pin adapted to electrically connect the circuit board and the corresponding one of the input terminal and the output terminal. The pin has a segment that is between the circuit board and the corresponding one of the input terminal and the output terminal and that has a length ranging from 4 to 15 mm.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
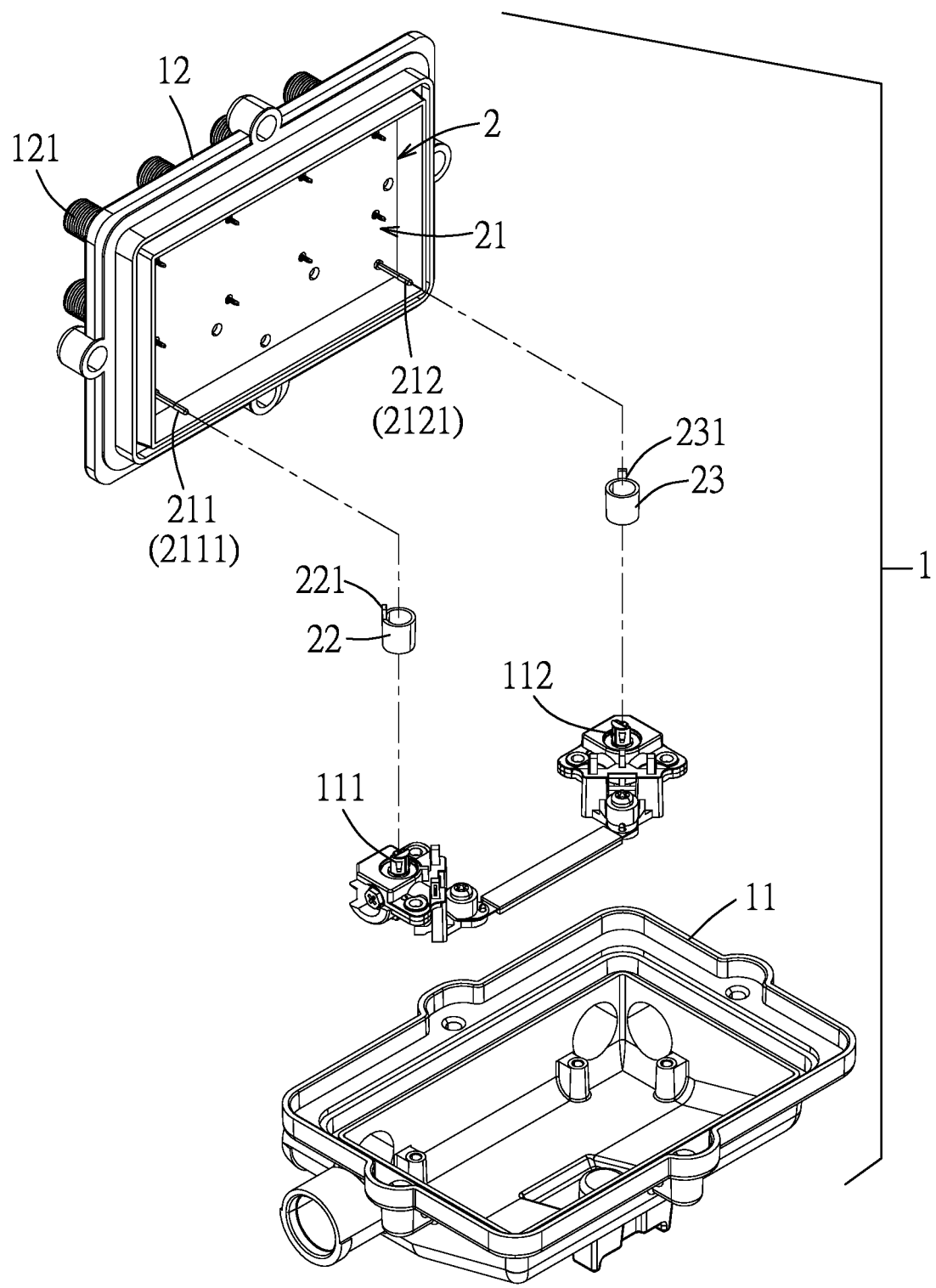
FIG. 1 is an exploded perspective view illustrating an embodiment of the signal splitting device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
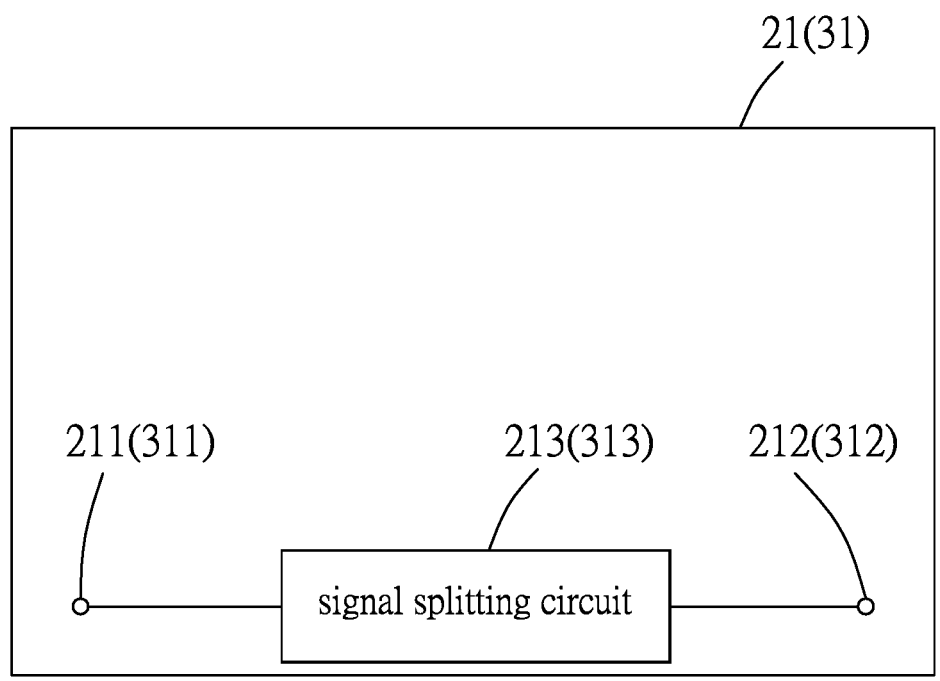
FIG. 2 is a block diagram illustrating a circuit on a circuit board of the signal splitting device according to an embodiment of this disclosure.
Figure 3:
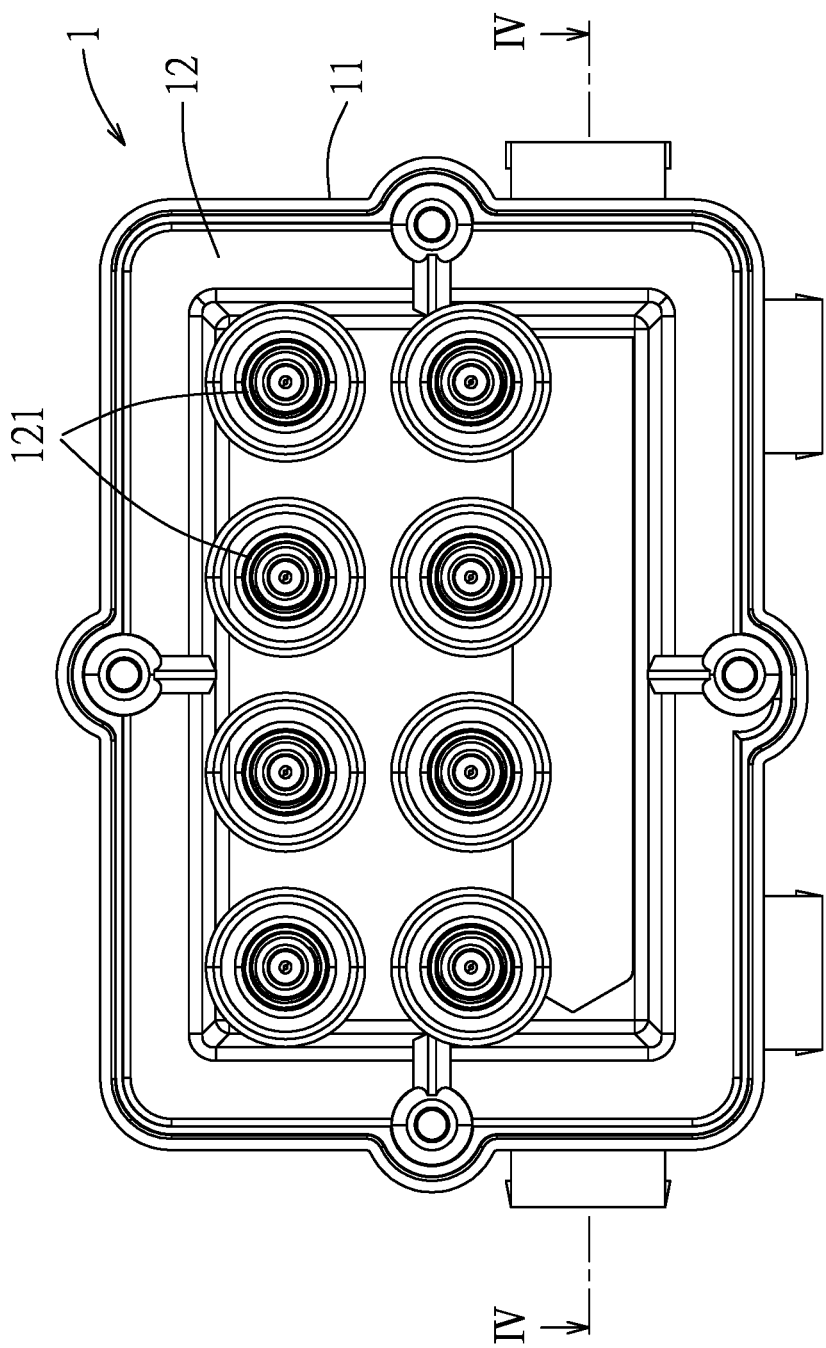
FIG. 3 is a top view of a cable television (CATV) passive apparatus including the signal splitting device according to an embodiment of this disclosure.

Referring to FIGS. 1 to 3, a signal splitting device 2 is installed in a cable television (CATV) passive apparatus 1. The CATV passive apparatus 1 includes a base 11 and a cover 12 that are separably connected to each other, an input terminal 111 and an output terminal 112 that are spaced apart from each other and that are mounted to the base 11, and a plurality of output ports 121 that are mounted to the cover 12. For example, the CATV passive apparatus 1 is a CATV splitter.

The signal splitting device 2 is disposed in the cover 12. Specifically, the signal splitting device 2 includes a circuit board 21 that is disposed in the cover 12, and a first connecting terminal 211, a second connecting terminal 212 and a signal splitting circuit 213 that are mounted to the circuit board 21. The first connecting terminal 211 corresponds to the input terminal 111 in position, and is electrically connected to the input terminal 111. The second connecting terminal 212 is spaced apart from the first connecting terminal 211, corresponds to the output terminal 112 in position, and is electrically connected to the output terminal 112. The signal splitting circuit 213 is electrically connected between the first connecting terminal 211 and the second connecting terminal 212 for processing signals received from one of the first and second connecting terminals 211, 212 and outputting processed signals to the other one of the first and second connecting terminals 211, 212. Each of the input and output terminals 111, 112 is adapted to be electrically connected to a transmission line (e.g., a coaxial cable) (not shown) for transmitting a signal (e.g., an alternating-current (AC) signal and radio-frequency (RF) signal (e.g., a CATV signal)) from the transmission line that is connected to one of the terminals 111, 112 to the transmission line that is connected to the other one of the terminals 111, 112.

Each of the first and second connecting terminals 211, 212 includes a pin 2111, 2121 that electrically connects the circuit board 21 and the corresponding one of the input terminal 111 and the output terminal 112. Further referring to FIG. 4, the pin 2111, 2121 has a segment that is between the circuit board 21 and the corresponding one of the input terminal 111 and the output terminal 112 and that has a length (d) ranging from 4 to 15 mm. That is to say, when the base 11 and the cover 12 are tightly connected to each other and the first and second connecting terminals 211, 212 are connected respectively to the input and output terminals 111, 112, the pins 2111, 2121 respectively of the first and second connecting terminals 211, 212 set the input and output terminals 111, 112 apart from the circuit board 21 by a distance of the length (d).

The pins 2111, 2121 of the signal splitting device 2 are each substantially shaped in a cylinder that has a diameter ranging from 0.8 to 1.55 mm and a length ranging from 8 to 20 mm. The structural configuration of the pins 2111, 2121 allows each of the first connecting terminal 211 and the second connecting terminal 212 to be able to simultaneously load an RF signal and a current (e.g., an alternating current) of at least 10 A. It should be noted that loading a signal means carrying a signal throughout this disclosure. In this embodiment, each of the input terminal 111 and the output terminal 112 is a female connector, and the pin 2111, 2121 of each of the first and second connecting terminals 211, 212 is a metal pin that has a diameter ranging from 1.25 to 1.55 mm and that is adapted to be held by the corresponding one of the input terminal 111 and the output terminal 112.

By virtue of the structural design of the pins 2111, 2121, frequency of an input RF signal inputted to the CATV passive apparatus 1 and an output RF signal outputted by the CATV passive apparatus 1 may be increased to 1.5 GHz or above. That is to say, an RF signal having frequency ranging from 5 MHz to 1.5 GHz can pass through the CATV passive apparatus 1 along a signal transmission path from the input terminal 111 to the first connecting terminal 211, the signal splitting circuit 213, the second connecting terminal 212 and then the output terminal 112 in sequence. Therefore, frequency response of the CATV passive apparatus 1 is superior in comparison to the prior art.

It is noteworthy that, in some embodiments, the pin 2111, 2121 of each of the first and second connecting terminals 211, 212 may have at least two cylindrical segments of different diameters. Between any two cylindrical segments of the same pin 2111, 2121, the further the cylindrical segment is from the circuit board 21, the larger the diameter of the cylindrical segment. That is to say, the diameter of the metal pin increases discretely in the direction away from the circuit board 21.

Figure 4:
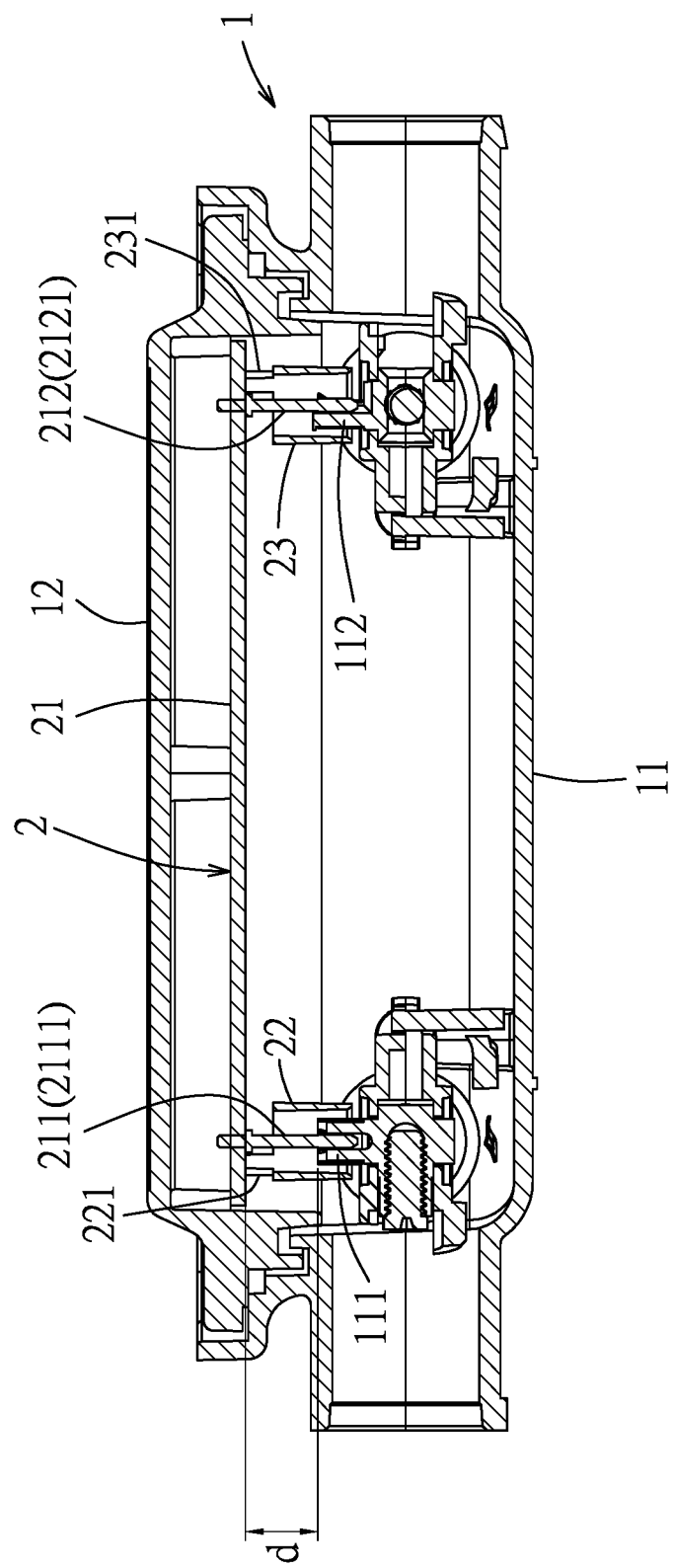
FIG. 4 is a sectional view taken along an imaginary line IV-IV in FIG. 3.

Referring to FIGS. 1 and 4, the signal splitting device 2 of this embodiment further includes two insulating sleeves 22, 23. Each of the insulating sleeves 22, 23 has one end 221, 231 connected to the circuit board 21, and surrounds a respective one of the first connecting terminal 211 and the second connecting terminal 212. In this embodiment, each of the insulating sleeves 22, 23 is substantially shaped in a tube, and matches a periphery of one of the input terminal 111 and the output terminal 112 that corresponds to the respective one of the first connecting terminal 211 and the second connecting terminal 212. Accordingly, the insulating sleeves 22, 23 can facilitate connections of the first connecting terminal 211 and the second connecting terminal 212 respectively to the input terminal 111 and the output terminal 112, and can guide the pins 2111, 2121 respectively of the first connecting terminal 211 and the second connecting terminal 212 to be aligned with and inserted into the input terminal 111 and the output terminal 112, respectively.

To increase the bandwidth of a CATV system so that the upper limit of the useful frequency band is at least 1.5 GHz, an operator of the CATV system needs to, with respect to each CATV passive apparatus of the CATV system, replace a conventional signal splitting device of the CATV passive apparatus with the signal splitting device 2 of this disclosure. While making such replacement, the operator only needs to temporarily stop providing services to a few subscribers whose display devices are connected to the CATV passive apparatus currently being upgraded, without having to stop providing the service to all CATV subscribers of the CATV system all at once. Further, increasing the bandwidth of the CATV system does not require cutting the main transmission line and installing a new connector on the main transmission line for connecting abase of a new CATV passive apparatus, as with the prior art. Therefore, in addition to saving manpower, material resources and replacement costs, this disclosure makes increasing the bandwidth of the CATV system a much simpler task, thereby boosting the service provider's willingness to implement the upgrade to increase the bandwidth of the CATV system. Furthermore, since the signal splitting device 2 of this disclosure is mounted to the cover 12, in order to replace the conventional signal splitting device with the signal splitting device 2 of this disclosure efficiently, it would be practical to remove an original cover of the CATV passive apparatus along with the conventional signal splitting device disposed therein from the base 11 and replace the same with the cover 12 along with the signal splitting device 2 disposed therein.

Figure 5:
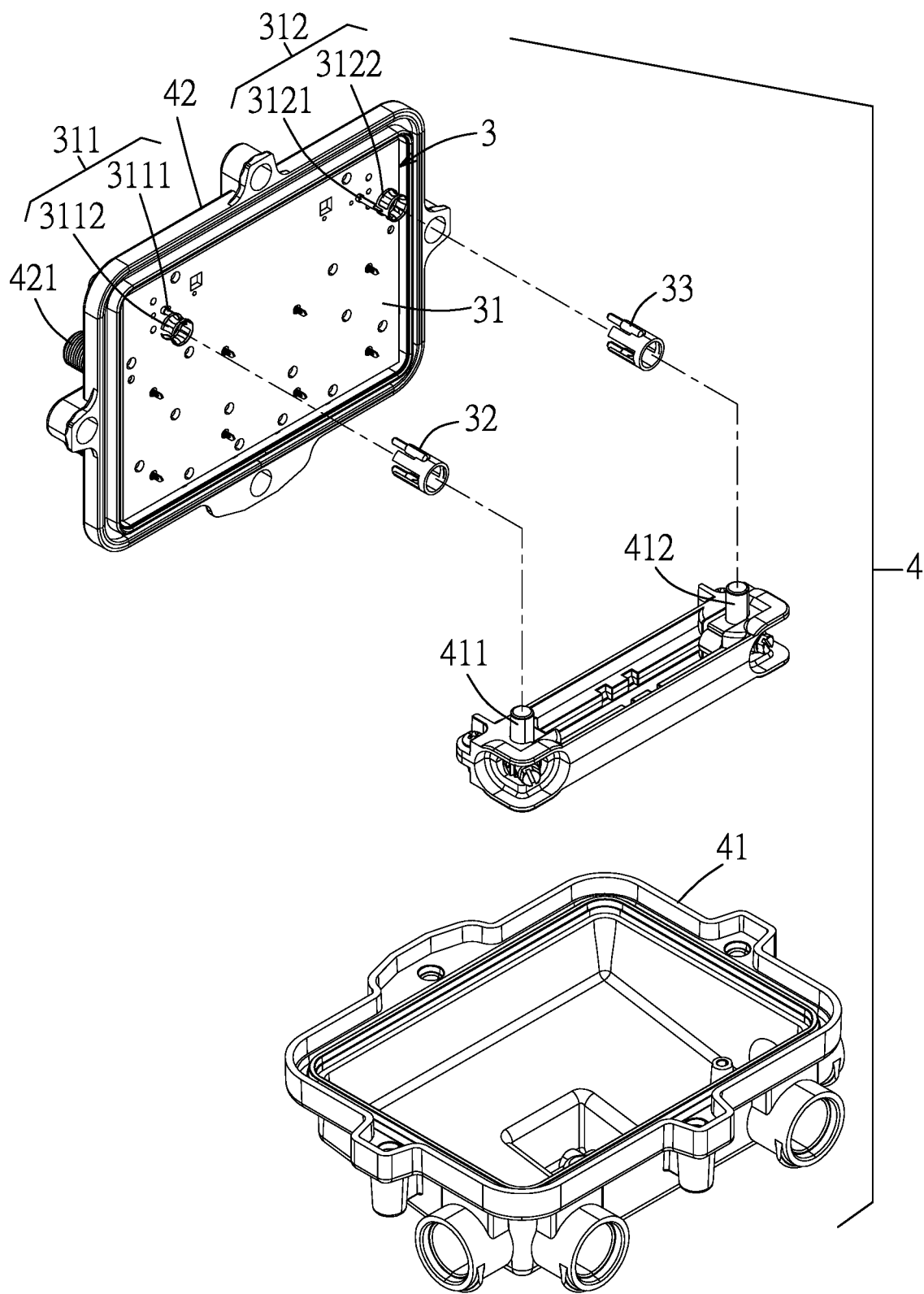
FIG. 5 is an exploded perspective view illustrating another embodiment of the signal splitting device according to the disclosure.
Figure 6:
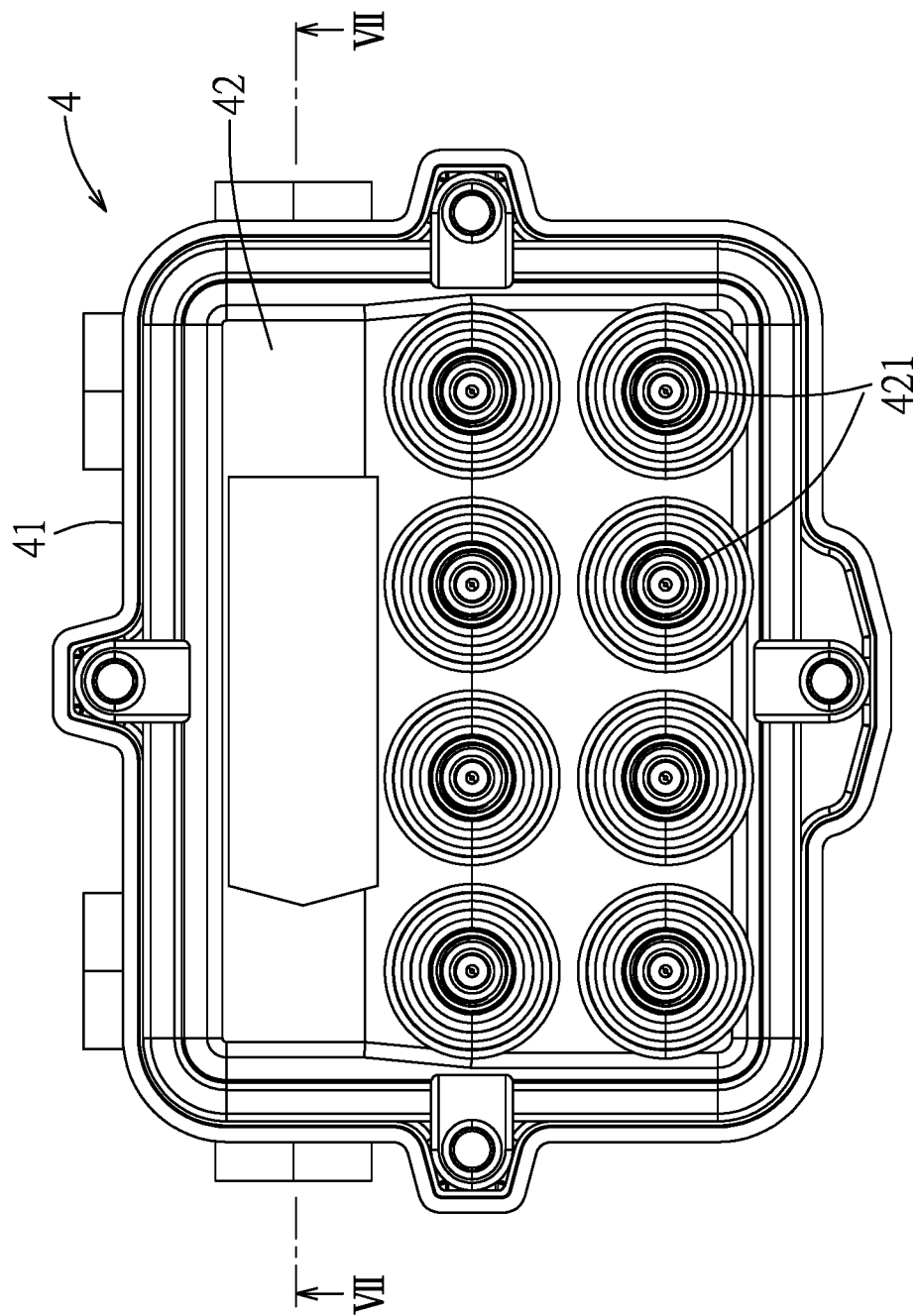
FIG. 6 is a top view of a CATV passive apparatus including the signal splitting device according to an embodiment of this disclosure.
Figure 7:
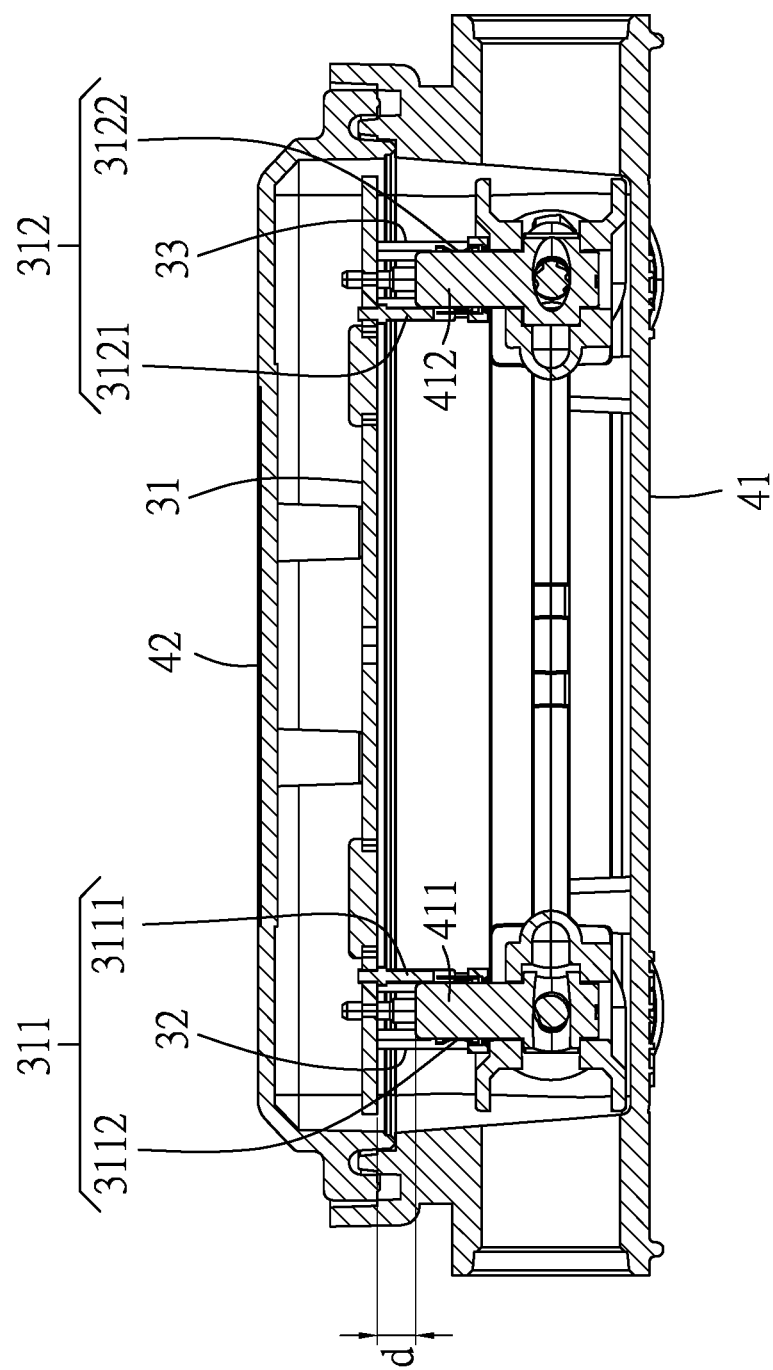
FIG. 7 is a sectional view taken along an imaginary line VII-VII in FIG. 6.

Referring of FIGS. 5 to 7, another embodiment of the signal splitting device 3 is installed in a CATV passive apparatus 4. The CATV passive apparatus 4 includes a base 41 and a cover 42 that are separably connected to each other, an input terminal 411 and an output terminal 412 that are spaced apart from each other and that are mounted to the base 41, and a plurality of output ports 421 mounted to the cover 42. Each of the input and output terminals 411, 412 is adapted to be electrically connected to a transmission line (e.g., a coaxial cable) (not shown) for transmitting a signal (e.g., an alternating current and an RF signal (e.g., a CATV signal)) from the transmission line that is connected to one of the terminals 411, 412 to the transmission line that is connected to the other one of the terminals 411, 412.

The signal splitting device 3 is disposed in the cover 42. Specifically, the signal splitting device 3 includes a circuit board 31 disposed in the cover 42, a first connecting terminal 311, a second connecting terminal 312, a signal splitting circuit 313 (see FIG. 2), and two insulating sleeves 32, 33. The first connecting terminal 311, the second connecting terminal 312 and the signal splitting circuit 313 (see FIG. 2) are mounted to the circuit board 31. The signal splitting circuit 313 is electrically connected between the first connecting terminal 311 and the second connecting terminal 312 for processing signals received from one of the first and second connecting terminals 311, 312 and outputting processed signals to the other one of the first and second connecting terminals 311, 312.

In this embodiment, each of the input terminal 411 and the output terminal 412 is a metal cylinder, and each of the first and second connecting terminals 311, 312 includes a pin 3111, 3121, and a metal sleeve 3112, 3122 that is spaced apart from the circuit board 31 and that is adapted to fittingly surround a corresponding one of the input terminal 411 and the output terminal 412. For each of the first and second connecting terminals 311, 312, the pin 3111, 3121 is similar to the pins 2111, 2121 (see FIG. 4) described in the previous embodiment, and has one end fixedly connected to the circuit board 31 and the other end connected to the metal sleeve 3112, 3122, so that the metal sleeve 3112, 3122 is suspended and spaced apart from the circuit board 31. The pin 3111, 3121 of each of the first and second connecting terminals 311, 312 is substantially shaped in a cylinder having a diameter ranging from 0.8 to 1.55 mm and a length ranging from 8 to 20 mm. Similar to the pin 2111, 2121, the structural configuration of the pins 3111, 3121 allows each of the first connecting terminal 311 and the second connecting terminal 312 to be able to simultaneously carry an RF signal and a current (e.g., an alternating current) of at least 10 A.

The insulating sleeves 32, 33 correspond respectively to the first and second connecting terminals 311, 312 in position. Each of the insulating sleeves 32, 33 is substantially shaped in a tube, and surrounds the metal sleeve 3112, 3122 of the corresponding one of the first and second connecting terminals 311, 312 so as to position the metal sleeve 3112, 3122 therein.

Each of the insulating sleeves 32, 33 has one end connected to the circuit board 31, and matches a periphery of one of the input terminal 411 and the output terminal 412 that corresponds to the respective one of the first connecting terminal 311 and the second connecting terminal 312. Accordingly, the insulating sleeves 32, 33 can facilitate connections of the first connecting terminal 311 and the second connecting terminal 312 respectively to the input terminal 411 and the output terminal 412.

The two insulating sleeves 32, 33 are capable of respectively supporting the metal sleeves 3112, 3122 of the first and second connecting terminals 311, 312 such that the metal sleeves 3112, 3122 can easily and respectively surround the input terminal 411 and the output terminal 412 and be electrically connected respectively to the input terminal 411 and the output terminal 412 when the first and second connecting terminals 311, 312 are connected respectively to the input and output terminals 411, 412. These two insulating sleeves 32, 33 are not essential components and may be omitted depending on actual application.

Further, similar to the pins 2111, 2121 shown in FIG. 4, the pin 3111, 3121 of each of the first and second connecting terminals 311, 312 of this embodiment has a segment that is between the circuit board 31 and the corresponding one of the input terminal 411 and the output terminal 412 and that has the length (d) ranging from 4 to 15 mm. That is to say, the pins 3111, 3121 respectively of the first and second connecting terminals 311, 312 keep the input and output terminals 411, 412 apart from the circuit board 31 by a distance of the length (d).

By virtue of the structural design of the pins 3111, 3121, frequency of an input RF signal inputted to the CATV passive apparatus 4 and an output RF signal outputted by the CATV passive apparatus 4 may be increased to 1.5 GHz or above. That is to say, an RF signal having frequency of less than or equal to 1.5 GHz can pass through the CATV passive apparatus 4 along a signal transmission path from the input terminal 411 to the first connecting terminal 311, the signal splitting circuit 313, the second connecting terminal 312 and then the output terminal 412 in sequence. Therefore, frequency response of the CATV passive apparatus 4 is superior in comparison to the prior art.

It is worth mentioning that the pins 3111, 3121 may each have at least two cylindrical segments having different diameters. In this embodiment, between any two cylindrical segments of the same pin 2111, 2121 and from the perspective of the circuit board 21, the further cylindrical segment has larger diameter than the closer cylindrical segment. In other words, the diameter of each pin 3111, 3121 increases at fixed intervals in the direction away from the circuit board 31.

To increase the bandwidth of the CATV system so that the upper limit of the useful frequency band is 1.5 GHz or above, the operator of the CATV system only needs to, with respect to each CATV passive apparatus of the CATV system, replace the conventional signal splitting device thereof with the signal splitting device 3 of this disclosure, which simplifies the process required to realize an increase in the bandwidth of the CATV system so the operator would be more willing to do so. Furthermore, since the signal splitting device 3 is mounted to the cover 42, in order to replace the conventional signal splitting device with the signal splitting device 3 in an effective manner, it would be practical to remove the original cover along with the conventional signal splitting device disposed therein from the base 11 and replace the same with the cover 42 along with the signal splitting device 3 disposed therein. In some embodiments, the signal splitting circuit 213, 313 may be a power supply circuit and be configured to receive an electric power (such as an alternating current) from an external power source at the input terminal 111, 411 through the first connecting terminal 211, 311 and to output the electric power, through the second connecting terminal 212, 312, to the output terminal 112, 412. It should be noted that current flow of the electric power may be reverse in direction; namely, the signal splitting circuit 213, 313 may receive the electric power at the output terminal 112, 412 through the second connecting terminal 212, 312 and output the electric power, through the first connecting terminal 211, 311, to the input terminal 111, 411.

Figure 8:
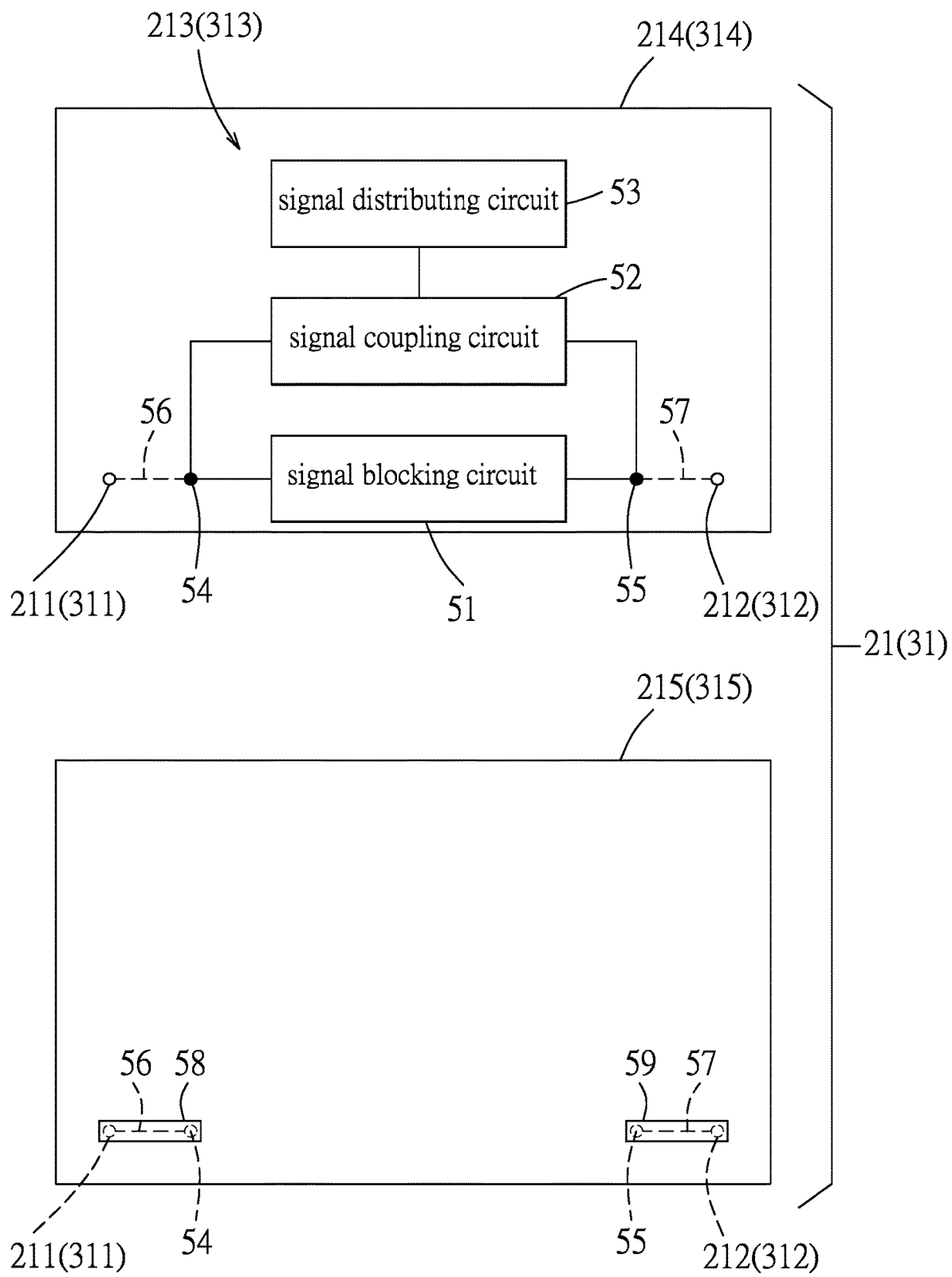
FIG. 8 is a block diagram illustrating circuit architecture of a signal splitting circuit of the signal splitting device according to an embodiment of the disclosure.

Referring to FIG. 8, the circuit board 21, 31 has a first side 214, 314 and a second side 215, 315 that are opposite to each other. The first connecting terminal 211, 311, the second connecting terminal 212, 312 and the signal splitting circuit 213, 313 are disposed on the first side 214, 314. In this embodiment, the signal splitting circuit 213, 313 is a radio frequency splitter configured to receive a main signal containing an AC signal and an RF signal from the input terminal 111, 411 (see FIG. 1 and FIG. 5) through the first connecting terminal 211, 311.

The signal splitting circuit 213, 313 includes a signal blocking circuit 51 and a signal coupling circuit 52 that are electrically connected between the first connecting terminal 211, 311 and the second connecting terminal 212, 312, and a signal distributing circuit 53 that is electrically connected to the signal coupling circuit 52. The signal blocking circuit 51 is configured to block the RF signal, and to allow the AC signal to pass therethrough and then through the second connecting terminal 212, 312 to the output terminal 112, 412 (see FIG. 1 and FIG. 5). The signal coupling circuit 52 is configured to receive the RF signal, to divide the RF signal into a first part and a second part, to transmit the first part of the RF signal to the second connecting terminal 212, 312, and to transmit the second part of the RF signal to the signal distributing circuit 53. The first part of the RF signal is then outputted to the output terminal 112, 412 through the second terminal 212, 312, and then combined with the AC signal to form a new main signal, so the output terminal 112, 412 can output the new main signal containing the AC power and the RF signal (the first part) to the transmission line. It should be noted that the first and second parts of the RF signal contain the same data, and thus the main signal received by the signal splitting circuit 213, 313 and the new main signal should have the same data. The signal distributing circuit 53 is configured to receive the second part of the RF signal from the signal coupling circuit 52 and to distribute the second part of the RF signal to the output ports 121, 421 (see FIG. 1 and FIG. 6) mounted on the cover 12, 42 (see FIG. 1 and FIG. 5), so that user-end devices (e.g., a television, a set-top box, etc.; not shown) that are electrically connected to the output ports 121, 421 can use the RF signal.

The signal splitting circuit 213, 313 further includes a first contact point 54, a second contact point 55, a first conducting wire 56, a second conducting wire 57, a first supplementary wire 58 and a second supplementary wire 59.

The first contact point 54 and the second contact point 55 are disposed on the first side 214, 314 of the circuit board 21, 31, and the signal blocking circuit 51 and the signal coupling circuit 52 are electrically connected to each other to form a parallel circuit that is electrically connected to and between the first and second contact points 54, 55.

The first conducting wire 56 is disposed on the second side 215, 315, and electrically connects the first connecting terminal 211, 311 and the first contact point 54. The second conducting wire 57 is also disposed on the second side 215, 315, and electrically connects the second connecting terminal 212, 312 and the second contact point 55.

The first supplementary wire 58 is disposed on the second side 215, 315, electrically connects the first connecting terminal 211, 311 and the first contact point 54, and covers and in contact with the entirety of the first conducting wire 56. The second supplementary wire 59 is also disposed on the second side 215, 315, electrically connects the second connecting terminal 212, 312 and the second contact point 55, and covers and in contact with the entirety of the second conducting wire 57.

Each of the first conducting wire 56 and the second conducting wire 57 is copper foil plated on the second side 215, 315, and each of the first and second supplementary wires 58, 59 is a metal wire (e.g., a copper wire) having a length ranging from 8 to 16 mm and a diameter ranging from 0.8 to 1.3 mm. Accordingly, the RF signal can be successfully transmitted into the RF signal coupling circuit 52, which means that when an input RF signal inputted to the RF signal coupling circuit 52 has a frequency of 1.5 GHz, a frequency of an output RF signal outputted from the RF signal coupling circuit 52 is also 1.5 GHz. As a result, the frequency response of the CATV passive apparatus 1, 4 to the RF signal can be enhanced and attenuation of the RF signal can be reduced. Moreover, insertion loss of the RF signal in each transmission band within the useful frequency band of the CATV passive apparatus 1, 4 can be further reduced.

Figure 9:
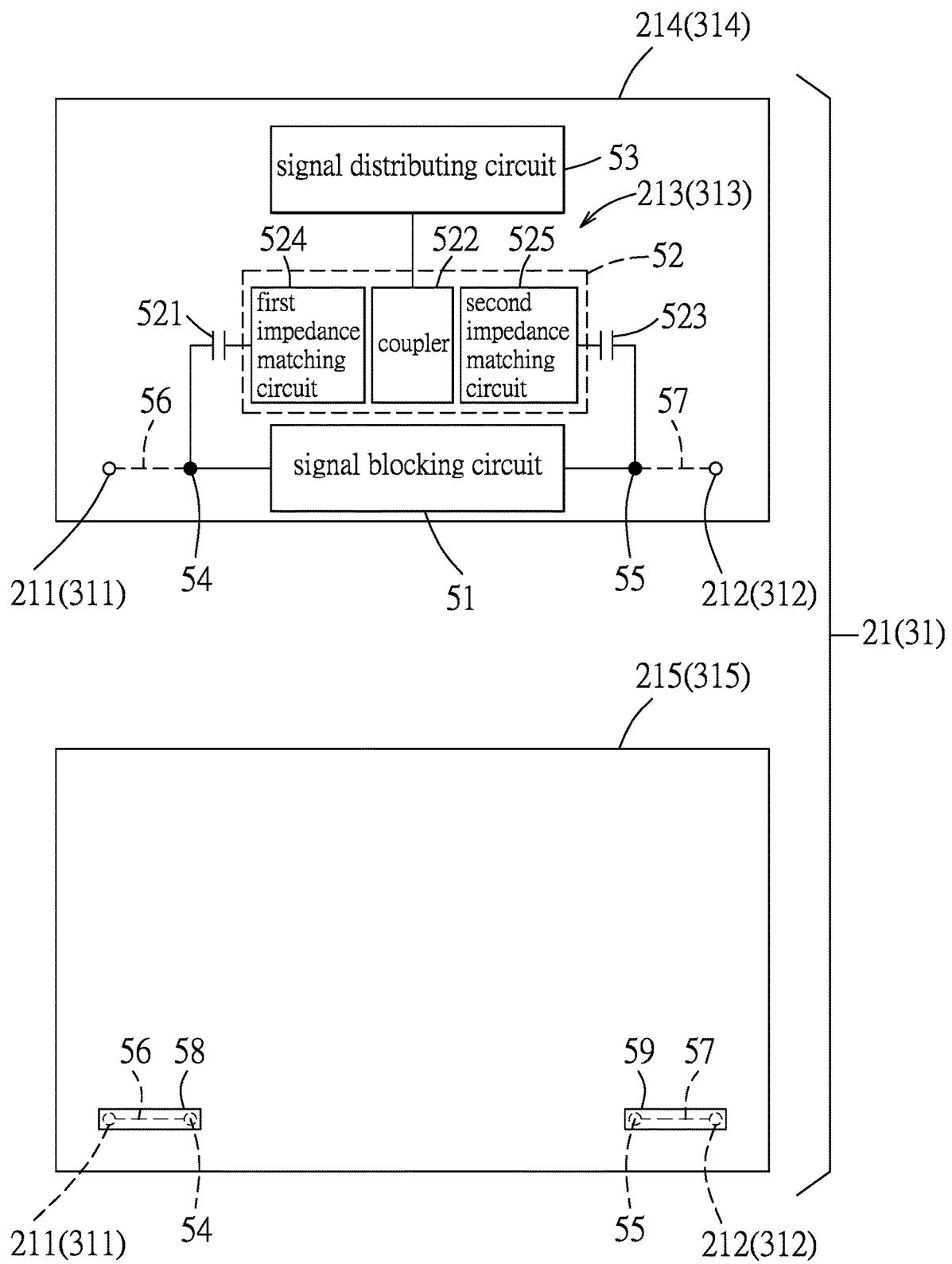
FIG. 9 is a block diagram illustrating circuit architecture of a signal coupling circuit of the signal splitting device according to an embodiment of the disclosure.

Referring to FIG. 9, the signal coupling circuit 52 includes a first capacitor 521, a coupler 522, and a second capacitor 523.

The first capacitor 521 has a first end electrically connected to the first connecting terminal 211, 311 through the first conducting wire 56, and a second end electrically connected to the coupler 522. The second capacitor 523 has a first end electrically connected to the second connecting terminal 212, 312 through the second conducting wire 57, and a second end electrically connected to the coupler 522. The coupler 522 is electrically connected between the second ends respectively of the first and second capacitors 521, 523.

In one implementation, the signal coupling circuit 52 further includes a first impedance matching circuit 524 and a second impedance matching circuit 525. The first impedance matching circuit 524 is electrically connected to the first capacitor 521 and the coupler 522; specifically, the first impedance matching circuit 524 is electrically connected between the second end of the first capacitor 521 and the coupler 522. The second impedance matching circuit 525 is electrically connected to the second capacitor 523 and the coupler 522; specifically, the second impedance matching circuit 525 is electrically connected between the second end of the second capacitor 523 and the coupler 522. For example, each of the first and second impedance matching circuits 524, 525 is a metal conducting wire (e.g., a copper wire) that electrically connects the coupler 522 and the corresponding one of the first and second capacitors 521, 523, and that has a length ranging from 4 to 7 mm and a diameter ranging from 0.2 to 0.5 mm. In some embodiments, each of the first and second impedance matching circuits 524, 525 may be a segment of copper foil that is formed (plated) on one of the first side 214, 314 and the second side 215, 315 of the circuit board 21, 31, that electrically connects the coupler 522 and the corresponding one of the first and second capacitors 521, 523, and that has a length ranging from 4 to 7 mm and a width ranging from 0.2 to 0.5 mm. In other embodiments, each of the first and second impedance matching circuits 524, 525 could also be a hollow inductor.

By virtue of the first impedance matching circuit 524 and the second impedance matching circuit 525, the RF signal can be successfully transmitted into the RF signal coupling circuit 52, so the frequency response of the CATV passive apparatus 1, 4 to the RF signal can be improved and attenuation of the RF signal can be reduced. Moreover, the insertion loss of the RF signal in each transmission band within the useful frequency band of the CATV passive apparatus 1, 4 can be further reduced.

Figure 10:
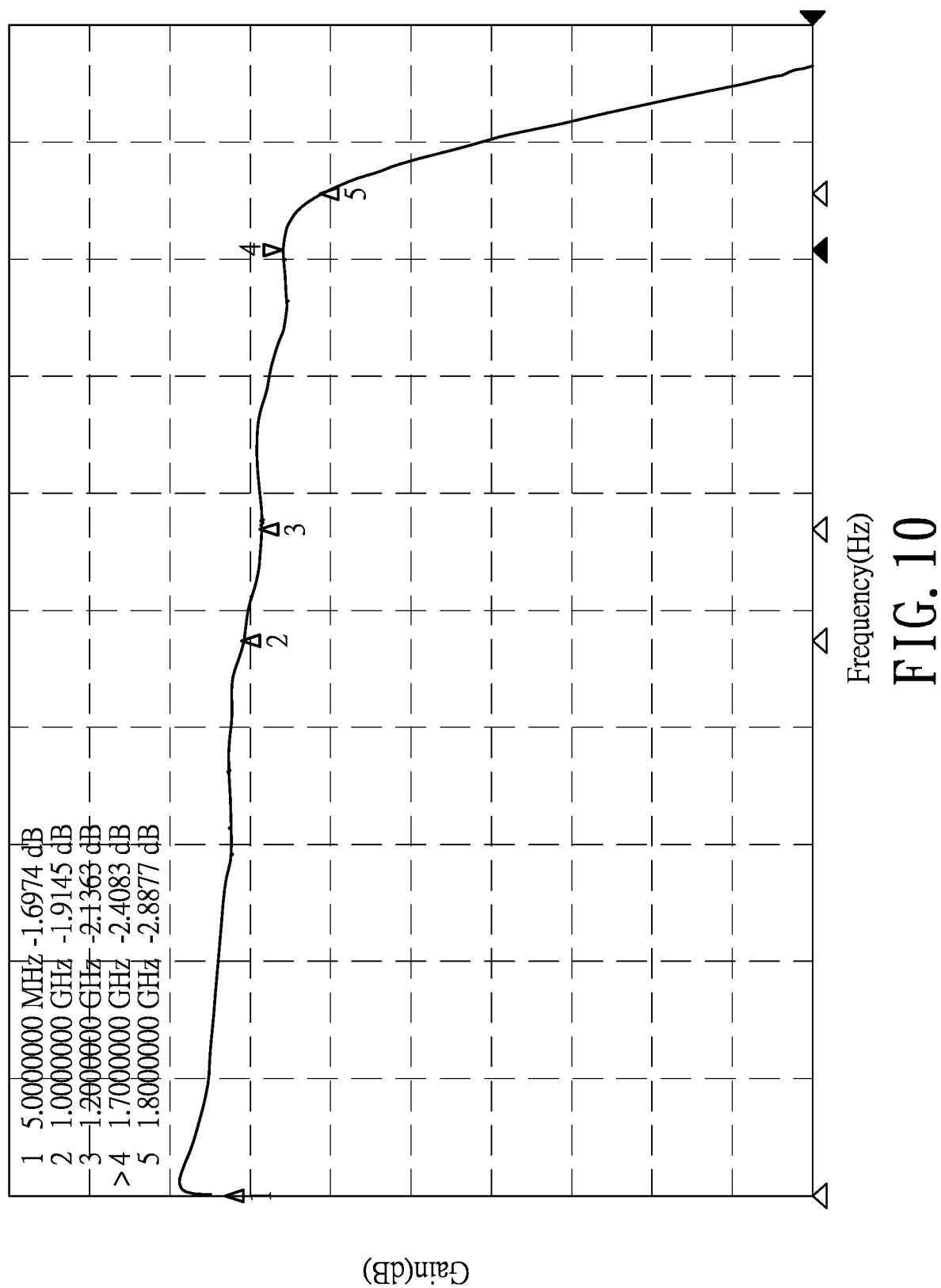
FIG. 10 shows a result of insertion loss of a radio-frequency signal transmitted through the signal splitting device according to an embodiment of the disclosure.

FIG. 10 shows a result of the insertion loss of the RF signal transmitted through an exemplary signal splitting device according to an embodiment of the disclosure. It can be seen from FIG. 10 that the useful frequency band of the CATV passive apparatus of this disclosure can cover 1.5 GHz, even up to 1.8 GHz (i.e., the useful frequency band ranges from 5 MHz to 1.8 GHz), and the insertion loss can be kept relatively low.

In summary, according to the aforementioned embodiments, by virtue of the first connecting terminal 211, 311 and the second connecting terminal 212, 312 that are disposed on the circuit board 21, 31 placed within the cover 12, 42, the input terminal 111, 411 and the output terminal 112, 412 disposed on the base 11, 41 are spaced apart from the circuit board 21, 31 by 4 to 15 mm when the base 11, 41 is tightly connected to the cover 12, 42. In consequence, the bandwidth of the CATV passive apparatus 1, 4 can be increased so that the useful frequency band covers 1.5 GHz or above. When it is desired to increase the bandwidth of the CATV system, the operator of the CATV system can simply replace the conventional signal splitting device together with the original cover with the signal splitting device 2, 3 together with the cover 12, 42 of this disclosure. The simplicity of the replacement procedure would make the operator more willing to upgrade the CATV system and widen the useful frequency band thereof.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A signal splitting device adapted to be installed in a cable television (CATV) passive apparatus, the CATV passive apparatus including a base and a cover that are separably connected to each other, and an input terminal and an output terminal that are spaced apart from each other and that are mounted to the base, each of the input terminal and the output terminal being a metal cylinder, said signal splitting device comprising:
   a circuit board that is adapted to be disposed in the cover;
   a first connecting terminal that is mounted to said circuit board, and that is adapted to correspond to the input terminal in position and to be electrically connected to the input terminal;
   a second connecting terminal that is mounted to said circuit board, that is spaced apart from said first connecting terminal, and that is adapted to correspond to the output terminal in position and to be electrically connected to the output terminal;
   a signal splitting circuit that is disposed on said circuit board and that is electrically connected between said first connecting terminal and said second connecting terminal; and
   two insulating sleeves, each of said insulating sleeves having one end that is connected to said circuit board, surrounding a respective one of said first connecting terminal and said second connecting terminal, and being adapted to match a periphery of one of the input terminal and the output terminal that corresponds to the respective one of said first connecting terminal and said second connecting terminal and to facilitate connection of the respective one of said first connecting terminal and said second connecting terminal to the corresponding one of the input terminal and the output terminal,
   wherein each of said first and second connecting terminals includes a pin that is adapted to electrically connect said circuit board and the corresponding one of the input terminal and the output terminal, and said pin of each of said first and second connecting terminals has a segment that is between said circuit board and the corresponding one of the input terminal and the output terminal and that has a length ranging from 4 to 15 mm, such that said circuit board and the corresponding one of the input terminal and the output terminal are separated by the length of said pin, and such that a useful frequency band of the CATV passive apparatus covers 1.5 GHz,
   wherein said pin of each of said first and second connecting terminals is substantially shaped in a cylinder that has a diameter ranging from 0.8 to 1.55 mm and a length ranging from 8 to 20 mm,
   wherein each of said first and second connecting terminals further includes a metal sleeve that is spaced apart from said circuit board and that is adapted to fittingly surround the corresponding one of the input terminal and the output terminal, and said pin of each of said first and second connecting terminals has one end fixedly connected to said circuit board and the other end connected to said metal sleeve,
   wherein each of said insulating sleeves is substantially shaped in a tube, and surrounds said metal sleeve of the respective one of said first and second connecting terminals so as to position the respective one of said first and second connecting terminals therein,
   wherein said circuit board has a first side, and said first and second connecting terminals and said signal splitting circuit are disposed on said first side,
   wherein said signal splitting circuit is configured to receive a main signal containing an alternating-current (AC) signal and a radio-frequency (RF) signal from the input terminal through said first connecting terminal, and includes:
      a signal blocking circuit electrically connected between said first and second connecting terminals, and configured to block the RF signal and to allow the AC signal to pass therethrough to said second connecting terminal,
      a signal coupling circuit electrically connected between said first and second connecting terminals, and configured to receive the RF signal, to transmit a first part of the RF signal to said second connecting terminal, and to output a second part of the RF signal, and
      a signal distributing circuit electrically connected to said signal coupling circuit, and configured to receive the second part of the RF signal from said signal coupling circuit and to distribute the second part of the RF signal, and wherein said signal coupling circuit includes:
a first capacitor having a first end that is electrically connected to said first connecting terminal, and a second end,
a second capacitor having a first end that is electrically connected to said second connecting terminal, and a second end,
a coupler electrically connected between said second ends respectively of said first and second capacitors,
a first impedance matching circuit electrically connecting said first capacitor and said coupler, and
a second impedance matching circuit electrically connecting said second capacitor and said coupler.

2. The signal splitting device of claim 1, wherein said pin of each of said first and second connecting terminals has two cylindrical segments having different diameters.

3. The signal splitting device of claim 1, wherein said signal splitting circuit is a power supply circuit, and is configured to receive an electric power from an external power source and to output the electric power, through one of said first and second connecting terminals, to one of the input terminal and the output terminal that corresponds to said one of said first and second connecting terminals.

4. A signal splitting device adapted to be installed in a cable television (CATV) passive apparatus, the CATV passive apparatus including a base and a cover that are separably connected to each other, and an input terminal and an output terminal that are spaced apart from each other and that are mounted to the base, each of the input terminal and the output terminal being a metal cylinder, said signal splitting device comprising:
a circuit board that is adapted to be disposed in the cover;
a first connecting terminal that is mounted to said circuit board, and that is adapted to correspond to the input terminal in position and to be electrically connected to the input terminal;
a second connecting terminal that is mounted to said circuit board, that is spaced apart from said first connecting terminal, and that is adapted to correspond to the output terminal in position and to be electrically connected to the output terminal;
a signal splitting circuit that is disposed on said circuit board and that is electrically connected between said first connecting terminal and said second connecting terminal; and
two insulating sleeves, each of said insulating sleeves having one end that is connected to said circuit board, surrounding a respective one of said first connecting terminal and said second connecting terminal, and being adapted to match a periphery of one of the input terminal and the output terminal that corresponds to the respective one of said first connecting terminal and said second connecting terminal and to facilitate connection of the respective one of said first connecting terminal and said second connecting terminal to the corresponding one of the input terminal and the output terminal,
wherein each of said first and second connecting terminals includes a pin that is adapted to electrically connect said circuit board and the corresponding one of the input terminal and the output terminal, and said pin of each of said first and second connecting terminals has a segment that is between said circuit board and the corresponding one of the input terminal and the output terminal and that has a length ranging from 4 to 15 mm, such that said circuit board and the corresponding one of the input terminal and the output terminal are separated by the length of said pin, and such that a useful frequency band of the CATV passive apparatus covers 1.5 GHz,
wherein said pin of each of said first and second connecting terminals is substantially shaped in a cylinder that has a diameter ranging from 0.8 to 1.55 mm and a length ranging from 8 to 20 mm,
wherein each of said first and second connecting terminals further includes a metal sleeve that is spaced apart from said circuit board and that is adapted to fittingly surround the corresponding one of the input terminal and the output terminal, and said pin of each of said first and second connecting terminals has one end fixedly connected to said circuit board and the other end connected to said metal sleeve,
wherein each of said insulating sleeves is substantially shaped in a tube, and surrounds said metal sleeve of the respective one of said first and second connecting terminals so as to position the respective one of said first and second connecting terminals therein,
wherein said circuit board has a first side and a second side opposite to said first side, and said first and second connecting terminals and said signal splitting circuit are disposed on said first side,
wherein said signal splitting circuit is configured to receive a main signal containing an alternating-current (AC) signal and a radio-frequency (RF) signal from the input terminal through said first connecting terminal, and includes:
a signal blocking circuit electrically connected between said first and second connecting terminals, and configured to block the RF signal and to allow the AC signal to pass therethrough to said second connecting terminal,
a signal coupling circuit electrically connected between said first and second connecting terminals, and configured to receive the RF signal, to transmit a first part of the RF signal to said second connecting terminal, and to output a second part of the RF signal,
a signal distributing circuit electrically connected to said signal coupling circuit, and configured to receive the second part of the RF signal from said signal coupling circuit and to distribute the second part of the RF signal,
a first contact point and a second contact point that are disposed on said first side of said circuit board, wherein said signal blocking circuit and said signal coupling circuit are electrically connected to each other to form a parallel circuit that is electrically connected to and between said first and second contact points,
a first conducting wire disposed on said second side, and electrically connecting said first connecting terminal and said first contact point,
a second conducting wire disposed on said second side, and electrically connecting said second connecting terminal and said second contact point,
a first supplementary wire disposed on said second side, electrically connecting said first connecting terminal and said first contact point, and covering and in contact with the entirety of said first conducting wire, and
a second supplementary wire disposed on said second side, electrically connecting said second connecting terminal and said second contact point, and covering and in contact with the entirety of said second conducting wire, and wherein each of said first and second supplementary wires has a length ranging from 8 to 16 mm and a diameter ranging from 0.8 to 1.3 mm.

5. The signal splitting device of claim 1, wherein each of said first and second impedance matching circuits is a metal conducting wire that electrically connects said coupler and the corresponding one of said first and second capacitors, and that has a length ranging from 4 to 7 mm and a diameter ranging from 0.2 to 0.5 mm.

6. The signal splitting device of claim 1, wherein each of said first and second impedance matching circuits is a segment of copper foil that electrically connects said coupler and the corresponding one of said first and second capacitors, and that has a length ranging from 4 to 7 mm and a width ranging from 0.2 to 0.5 mm.

7. A signal splitting device adapted to be installed in a cable television (CATV) passive apparatus, the CATV passive apparatus including a base and a cover that are separably connected to each other, and an input terminal and an output terminal that are spaced apart from each other and that are mounted to the base, each of the input terminal and the output terminal being a female connector, said signal splitting device comprising:

a circuit board that is adapted to be disposed in the cover;

a first connecting terminal that is mounted to said circuit board, and that is adapted to correspond to the input terminal in position and to be electrically connected to the input terminal;

a second connecting terminal that is mounted to said circuit board, that is spaced apart from said first connecting terminal, and that is adapted to correspond to the output terminal in position and to be electrically connected to the output terminal; and a signal splitting circuit that is disposed on said circuit board and that is electrically connected between said first connecting terminal and said second connecting terminal, wherein each of said first and second connecting terminals includes a pin that is adapted to electrically connect said circuit board and the corresponding one of the input terminal and the output terminal, and said pin of each of said first and second connecting terminals has a segment that is between said circuit board and the corresponding one of the input terminal and the output terminal and that has a length ranging from 4 to 15 mm, such that said circuit board and the corresponding one of the input terminal and the output terminal are separated by the length of said pin, and such that a useful frequency band of the CATV passive apparatus covers 1.5 GHz, wherein said pin of each of said first and second connecting terminals is substantially shaped in a cylinder that has a diameter ranging from 0.8 to 1.55 mm and a length ranging from 8 to 20 mm, wherein said pin of each of said first and second connecting terminals is a metal pin that has a diameter ranging from 1.25 to 1.55 mm and that is adapted to be held by the corresponding one of the input terminal and the output terminal, wherein said circuit board has a first side, and said first and second connecting terminals and said signal splitting circuit are disposed on said first side, wherein said signal splitting circuit is configured to receive a main signal containing an alternating-current (AC) signal and a radio-frequency (RF) signal from the input terminal through said first connecting terminal, and includes a signal blocking circuit electrically connected between said first and second connecting terminals, and configured to block the RF signal and to allow the AC signal to pass therethrough to said second connecting terminal, a signal coupling circuit electrically connected between said first and second connecting terminals, and configured to receive the RF signal, to transmit a first part of the RF signal to said second connecting terminal, and to output a second part of the RF signal, and a signal distributing circuit electrically connected to said signal coupling circuit, and configured to receive the second part of the RF signal from said signal coupling circuit and to distribute the second part of the RF signal, and wherein said signal coupling circuit includes:

a first capacitor having a first end that is electrically connected to said first connecting terminal, and a second end, a second capacitor having a first end that is electrically connected to said second connecting terminal, and a second end, a coupler electrically connected between said second ends respectively of said first and second capacitors, a first impedance matching circuit electrically connecting said first capacitor and said coupler, and a second impedance matching circuit electrically connecting said second capacitor and said coupler.

8. The signal splitting device of claim 7, wherein said pin of each of said first and second connecting terminals has two cylindrical segments having different diameters.

9. The signal splitting device of claim 7, wherein said signal splitting circuit is a power supply circuit, and is configured to receive an electric power from an external power source and to output the electric power, through one of said first and second connecting terminals, to one of the input terminal and the output terminal that corresponds to said one of said first and second connecting terminals.

10. The signal splitting device of claim 7, wherein said circuit board further has a second side opposite to said first side, and said signal splitting circuit further includes:

a first contact point and a second contact point that are disposed on said first side of said circuit board, wherein said signal blocking circuit and said signal coupling circuit are electrically connected to each other to form a parallel circuit that is electrically connected to and between said first and second contact points;

a first conducting wire disposed on said second side, and electrically connecting said first connecting terminal and said first contact point;

a second conducting wire disposed on said second side, and electrically connecting said second connecting terminal and said second contact point;

a first supplementary wire disposed on said second side, electrically connecting said first connecting terminal and said first contact point, and covering and in contact with the entirety of said first conducting wire; and a second supplementary wire disposed on said second side, electrically connecting said second connecting terminal and said second contact point, and covering and in contact with the entirety of said second conducting wire, and wherein each of said first and second supplementary wires has a length ranging from 8 to 16 mm and a diameter ranging from 0.8 to 1.3 mm.

11. The signal splitting device of claim 7, wherein each of said first and second impedance matching circuits is a metal conducting wire that electrically connects said coupler and the corresponding one of said first and second capacitors, and that has a length ranging from 4 to 7 mm and a diameter ranging from 0.2 to 0.5 mm.

12. The signal splitting device of claim 7, wherein each of said first and second impedance matching circuits is a segment of copper foil that electrically connects said coupler and the corresponding one of said first and second capacitors, and that has a length ranging from 4 to 7 mm and a width ranging from 0.2 to 0.5 mm.

13. The signal splitting device of claim 1, wherein each of said first and second connecting terminals is configured to carry a radio-frequency signal and a current of at least 10 A.

14. The signal splitting device of claim 4, wherein said pin of each of said first and second connecting terminals has two cylindrical segments having different diameters.

15. The signal splitting device of claim 4, wherein said signal splitting circuit is a power supply circuit, and is configured to receive an electric power from an external power source and to output the electric power, through one of said first and second connecting terminals, to one of the input terminal and the output terminal that corresponds to said one of said first and second connecting terminals.

16. The signal splitting device of claim 4, wherein each of said first and second connecting terminals is configured to carry a radio-frequency signal and a current of at least 10 A.

17. The signal splitting device of claim 7, wherein each of said first and second connecting terminals is configured to carry a radio-frequency signal and a current of at least 10 A.

* * * * *